United States Patent
Kukreja

(10) Patent No.: US 12,155,721 B1
(45) Date of Patent: Nov. 26, 2024

(54) ORCHESTRATION OF DIRECTORY MANAGEMENT UPDATES ACROSS REGIONS

(71) Applicant: Amazon Technologies, Inc., Seattle, WA (US)

(72) Inventor: Dinesh Ramesh Kukreja, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1052 days.

(21) Appl. No.: 16/710,681

(22) Filed: Dec. 11, 2019

(51) Int. Cl.
| | |
|---|---|
| H04L 67/1095 | (2022.01) |
| H04L 41/084 | (2022.01) |
| H04L 61/4552 | (2022.01) |
| H04L 67/1097 | (2022.01) |
| H04L 41/0859 | (2022.01) |
| H04L 61/5007 | (2022.01) |
| H04L 101/695 | (2022.01) |

(52) U.S. Cl.
CPC ...... *H04L 67/1095* (2013.01); *H04L 41/0846* (2013.01); *H04L 61/4552* (2022.05); *H04L 67/1097* (2013.01); *H04L 41/0863* (2013.01); *H04L 61/5007* (2022.05); *H04L 2101/695* (2022.05)

(58) Field of Classification Search
CPC . H04L 41/0806; H04L 41/12; H04L 41/5054; H04L 61/1505; H04L 61/1523; H04L 61/1552; H04L 61/6095; H04L 61/4552; H04L 41/0846; H04L 67/1095; H04L 67/1097
See application file for complete search history.

(56) References Cited

U.S. PATENT DOCUMENTS

| | | | |
|---|---|---|---|
| 6,915,309 B1* | 7/2005 | Conley | H04L 61/1523 |
| 10,009,443 B1* | 6/2018 | Guigli | H04L 67/1097 |
| 10,749,943 B1* | 8/2020 | Feiguine | H04L 67/1008 |
| 10,985,998 B1* | 4/2021 | Gujar | H04L 41/5051 |
| 11,025,688 B1* | 6/2021 | Ijjurouthu et al. | G06F 16/27 |
| 2007/0283148 A1* | 12/2007 | Warman | H04L 63/0209 713/168 |
| 2011/0302265 A1* | 12/2011 | Singh | H04L 29/12056 709/208 |

(Continued)

OTHER PUBLICATIONS

Pereira, P., "How to Increase the Redundancy and Performance of Your AWS Directory Service for Microsoft AD Directory by Adding Domain Controllers", AWS Security Blog, Jul. 6, 2017, 7 pages. (Year: 2017).*

(Continued)

*Primary Examiner* — Gregory Todd
(74) *Attorney, Agent, or Firm* — Nicholson De Vos Webster & Elliott LLP

(57) ABSTRACT

Techniques for orchestration of directory management updates across regions of a provider network are described. A method for orchestration of directory management updates across regions may include receiving a request at a service in a home region of a provider network to perform a cross-region service update, executing a cross-region workflow corresponding to the cross-region directory service update, and updating one or more resources of the service in each of a plurality of regions of the provider network based on the cross-region workflow.

20 Claims, 9 Drawing Sheets

(56) References Cited

U.S. PATENT DOCUMENTS

| | | | |
|---|---|---|---|
| 2016/0050125 A1* | 2/2016 | Mattson | H04L 41/5051 |
| | | | 709/225 |
| 2018/0262563 A1* | 9/2018 | Mohammed | G06F 9/46 |
| 2020/0067933 A1* | 2/2020 | Kukreja | H04L 63/104 |
| 2020/0204622 A1* | 6/2020 | Thyagarajan | H04L 67/1078 |
| 2021/0409449 A1* | 12/2021 | Crabtree | H04L 63/1408 |

OTHER PUBLICATIONS

Amazon.com, 2017, "AWS Directory Service Administration Guide Version 1.0", https://web.archive.org/web/20170815000000*/https://docs.aws.amazon.com/directoryservice/latest/admin-guide/directoryservice-admin-guide.pdf, pp. 1-204 (Year: 2017).*

* cited by examiner

```
addRegion{
402 ~ "regionID": [region to which customer requested to expand]
404 ~ "directoryId": [identifier associated with customer's directory]
406 ~ "customerId": [identifier associated with the customer]
407 ~ "customerVN": [identifier associated with the customer's VN]
}
```

400

```
expandDirectory{
410 ~ "directoryId": [identifier associated with customer's directory]
412 ~ "customerId": [identifier associated with the customer]
414 ~ "virtual network information": [CIDR allocated to new VN]
416 ~ "directorySize": [standard or enterprise]
417 ~ "number of domain controllers": [number of domain controllers to create]
}
```

408

```
restoreDirectory{
420 ~ "snapshotID": [identifier associated with snapshot to restore from]
}
```

ORCHESTRATION OF DIRECTORY MANAGEMENT UPDATES ACROSS REGIONS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine. Each such virtual machine is a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF DRAWINGS

Various embodiments in accordance with the present disclosure will be described with reference to the drawings, in which:

FIG. 4 is a diagram illustrating example APIs for orchestration of directory management updates across regions according to some embodiments.

DETAILED DESCRIPTION

The present disclosure relates to methods, apparatus, systems, and non-transitory computer-readable storage media for orchestration of directory management updates across regions. According to some embodiments, directory services can be replicated across regions of a provider network, enabling a customer's directory to be used to manage resources and users wherever those resources and users are located. To enable the directory service to operate in different regions, updates must be orchestrated across regions. Because different regions may have different security requirements, these updates must be provided in a secure, scalable, and isolated manner.

Figure 1:
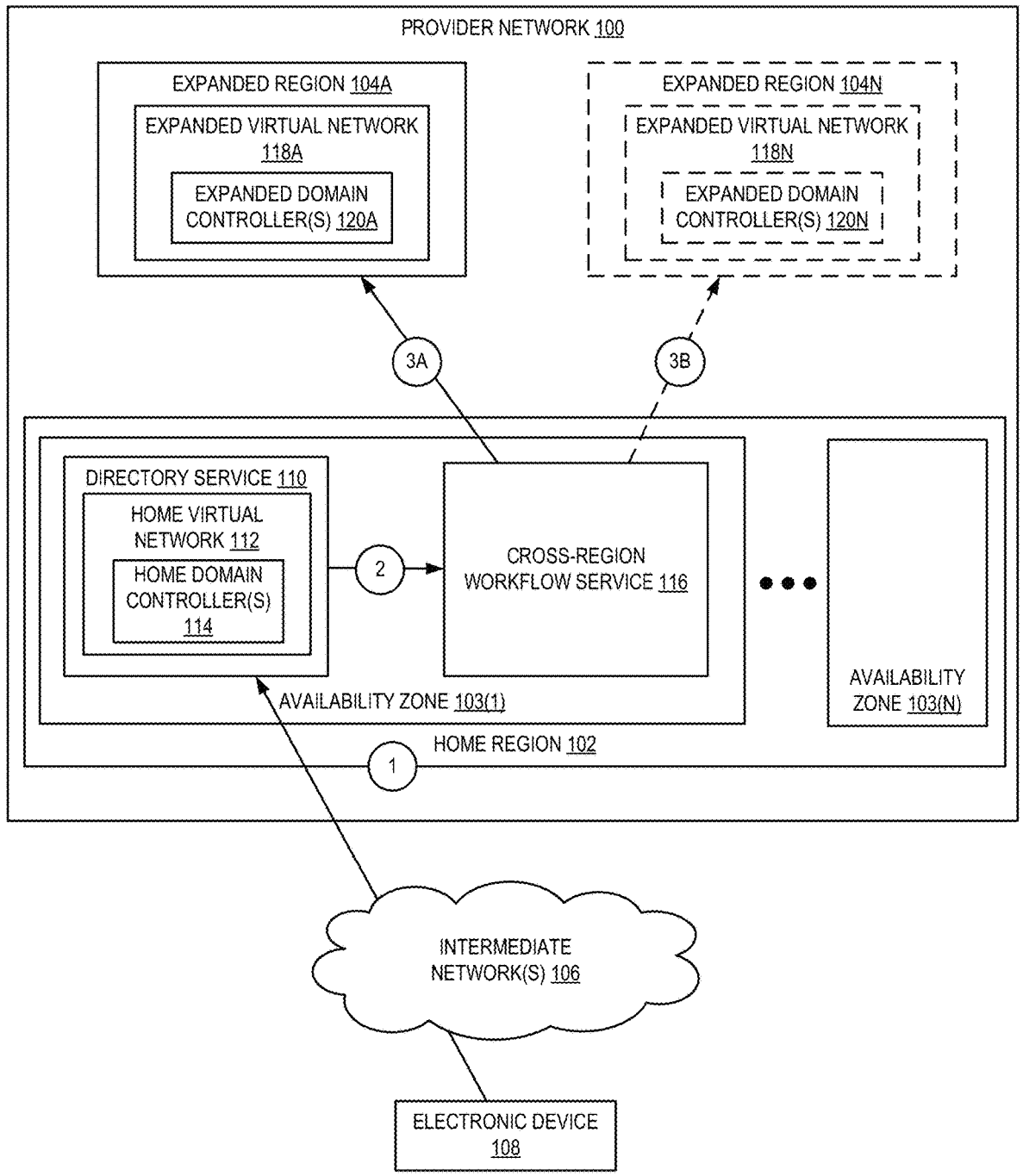
FIG. 1 is a diagram illustrating an environment for orchestration of directory management updates across regions according to some embodiments.

FIG. 1 is a diagram illustrating an environment for orchestration of directory management updates across regions according to some embodiments. As shown in FIG. 1, a user, using electronic device 108, can send a request to create a directory to a directory service 110 in provider network 100. A provider network can be divided into multiple regions, which represent regions in which the data centers which provide the resources of the provider network are clustered. The initial request from the user may be received in the user's home region 102 (e.g., the region of the provider network corresponding to the geographic region where the user is located). When the customer sends the create directory request, it is received by a directory service 110 in the customer's home region 102. The directory service 110 can create a virtual network (VN) 112 for the customer and two or more home domain controllers 114 and set up replication between the domain controllers.

Traditionally, directory services have been limited to a single region. However, it is advantageous to expand single region resources, such as directory service 110, to multiple regions, to provide for disaster recovery, lower latency, higher availability, etc. In some embodiments, when the create directory request can include a selection of one or more additional regions (e.g., expanded regions 104A-104N) in which the directory is to be supported. In some embodiments, an existing directory can also be expanded into new regions selected by the user, as discussed further below. For example, an expanded virtual network 118A-118N can be created in each expanded region 104A-104N. As the directory is expanded across regions, orchestration of cross-region communication is required.

A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

A cloud provider network can be formed as a number of regions, where a region may be a geographical area in which the cloud provider clusters data centers. Each region can include multiple (e.g., two or more) availability zones (AZs) connected to one another via a private high-speed network, for example a fiber communication connection. An AZ may provide an isolated failure domain including one or more data center facilities with separate power, separate networking, and separate cooling from those in another AZ. Preferably, AZs within a region are positioned far enough away from one other that a same natural disaster (or other failure-inducing event) should not affect or take more than one AZ offline at the same time. Customers can connect to AZ of the cloud provider network via a publicly accessible network (e.g., the Internet, a cellular communication network).

In some embodiments, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code-typically without the user having any control of or knowledge of the underlying compute instance(s) involved.

For example, in various embodiments, a "serverless" function may include code provided by a user or other entity-such as the provider network itself—that can be executed on demand. Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

Directory service 110 provides both global and regional services. Global services may include features which make modifications on the directory across all regions (e.g., global directories, restore operations, aliases, single sign-on, etc.). Regional services may include regional settings set by the customers for leveraging the directory across one region (multi-factor authentication, maintenance of IP routes, etc.). By maintaining a home region, the regional services can be supported by the home region while global services can be supported by each region into which the directory has expanded. In some embodiments, the region designated as the home region can be changed by the user. For example, a customer may relocate to a new geographic region associated with a different region of the provider network 100. In such instance, the customer can request that the home region of their directory be updated to the region to which they have moved.

As shown in FIG. 1, a user can send a request to directory service 110 in home region 102 (comprising availability zones 103(1)-103(N)), at numeral 1. The request may be to make changes to their directory (e.g., add or disable features provided by the directory service, restore the directory service to a prior state, expand the directory into a new region, etc.). Depending on the action requested by the user, the directory service can send a request, at numeral 2, to cross-region workflow service 116 to implement the request. Cross-region workflow service 116 may maintain a plurality of workflows for different actions, such as an expand workflow and a restore workflow. At numerals 3A and 3B, the cross-region workflow service 116 can communicate with the expanded domain controllers in expanded regions according to the workflow in use. This may include replicating data to the expanded regions for use in executing a workflow locally, which may be managed by a regional orchestrator, provisioning new resources to the expanded region or other directory management tasks. The workflows implemented by the cross-region workflow service may include synchronous workflows, in which a result may be returned when the workflow is complete, and asynchronous workflows, in which the results of the workflow may be available sometime after the workflow is complete.

Although embodiments are discussed with respect to a cross-region directory service and cross-region workflows that may be used to update the cross-region directory service, embodiments are similarly applicable to other cross-region services. Other cross-region services may include different resources which may be similarly updated by the cross-region workflow service and cross-region replicator. Also, similar expand and restore workflows may be implemented for different cross-region services. These workflows would operate on and using the specific resources of the cross-region service in use, rather than the domain controllers of the cross-region directory service described herein, but otherwise may be applied similarly.

Figure 2:
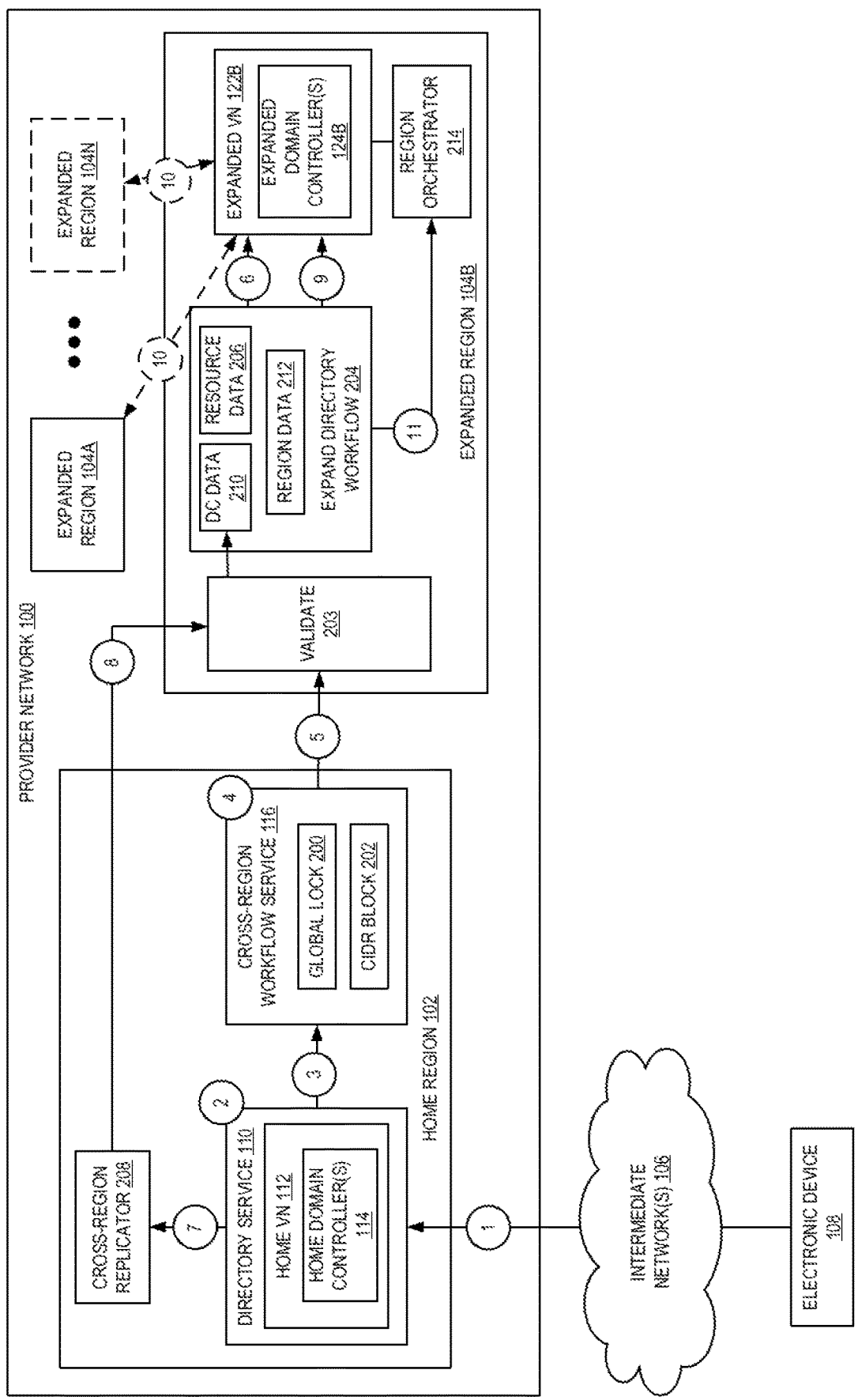
FIG. 2 is a diagram illustrating an expand workflow according to some embodiments.

FIG. 2 is a diagram illustrating an expand workflow according to some embodiments. As shown in FIG. 2, a customer may choose to expand an existing directory into one or more expanded regions. The existing directory may already exist in multiple regions, and another expanded region is being added, or the existing directory may be expanded from its home region into a new region. The expand workflow described herein is an example of a synchronous workflow orchestrated by cross-region workflow service 116. A user may send a request at numeral 1 to expand the directory service 110 into a new expanded region 104B. As discussed, the request may be received at the home domain controller 114 in the home virtual network 112 of the directory service in the customer's home region 102.

At numeral 2, in response to the request from the customer, the directory service 110 can execute an addRegion application programming interface (API). The addRegion API can perform initial validations on the request. For example, the addRegion API can determine a number of expanded regions associated with the customers directory, and a number of expanded regions in progress. In some embodiments, the number of expanded regions associated with the customer's directory may be limited by the directory service. Additionally, or alternatively, the number of concurrent expansions (e.g., corresponding to the number of expanded regions in progress) may be limited by the directory service. In some embodiments, these limits may be adjusted dynamically, based on the amount of available resources in the home region 102 or the expanded regions 104A-104N in which the customer has already expanded or is in the process of expanding to. In some embodiments, the addRegion API may also validate the region into which the customer has requested to expand. For example, it can be determined whether the customer has already expanded into the requested region and, if so, an error may be returned.

Once the request has been validated, at numeral 3, the addRegion API can trigger cross-region workflow service 116 to being the expand workflow to expand the customer's directory into the requested expanded region 104B. In some embodiments, the addRegion API may also handle any exceptions generated by the cross-region workflow service 116 and provide the exceptions to the customer for further review and/or input. At numeral 4, the cross-region workflow service 116 can obtain a lock 200 on directory 110. The lock 200 can be a global lock on the directory or a lock in a specific region or regions the directory is operating in. When a global lock is obtained, this prevents one region of the directory from becoming out of sync with other regions of the directory. In some embodiments, the lock 200 can be obtained using an Acquire-Lock API call which accepts a parameter for an amount of time the lock is to be in effect. Once lock 200 is obtained, an identifier may be associated with the lock and/or the requesting account. In some embodiments, if the expand workflow is taking longer than expected, the acquire-lock API may be called to extend the lock, using an identifier associated with the lock. Once the lock has been obtained, IP addresses, such as a Classless Inter-Domain Routing (CIDR) block 202, can be pre-allocated for the directory in the expanded region. By pre-allocating the CIDR block, the cross-region workflow service 116 can ensure that there are no IP address collisions between the addresses of existing virtual networks (e.g., home virtual network 112 and any other virtual networks in other expanded regions 104A-104N). In some embodiments, at step 4 we create a new virtual network can be created in the expanded region based on the pre-allocated addresses (e.g., CIDR block) and the customer's virtual network in the expanded region.

At numeral 5, once the global lock and CIDR block have been obtained, the cross-region workflow service 116 can call an expand directory workflow 204 in expanded region 104B. In various embodiments, the cross-region workflow service 116 can call an expand directory API to start the expand directory workflow in the expanded region. In some embodiments, each region in the provider network may be an opt-in region, which requires an access policy for every account that enables that account to access or otherwise operate in a new region. As a result, any requests coming into the expanded region 104B may first be validated 203, to ensure the account associated with the request has access to the expanded region. Validation may be performed by an access control service which may determine whether there is an access control policy associated with the account granted access to the expanded region. In some embodiments, every piece of orchestration in one region may be performed by a separate account from those performed in a second region, to maintain account isolation across regions. The expand directory API may receive parameters corresponding to a directory identifier for the customer's directory, a customer identifier, and details for the virtual network to be created (e.g., subnets, the pre-allocated CIDR block, etc.), the number of domain controllers to be provisioned, etc. In some embodiments, the expand directory API can also perform validation on the virtual network details to ensure a valid virtual network is being provisioned and then start the expand directory workflow 204. Although in the example of FIG. 2, the expand directory workflow is executed in the expanded region, in various embodiments, the expand directory workflow can be executed on any resources in provider network 100 which have access to expanded region 104B and are authorized to provision resources within expanded region 104B.

Expand directory workflow 204 can provision resources needed to expand the directory into the expanded region 104B, as shown at numeral 6. In some embodiments, the expand directory workflow 204 can obtain resource data 206 from the cross-region workflow service which identifies the resources to be provisioned. The resource data 206 received from the cross-region workflow service may also include the pre-allocated CIDR block for use in provisioning the new resources. This may include provisioning the expanded virtual network 122B in expanded region 104B and one or more expanded domain controllers 124B in the expanded virtual network. The expand directory workflow may also provision other resources such as subnets, route-tables, security-groups, autoscaling groups, etc.

Once the resources have been provisioned, a directory site can be created in the region using the provision resources. The directory site enables information to be replicated among the domain controllers provisioned in the expanded region and may include one or more routes that define the most efficient ways of sending replication traffic between domain controllers in the provisioned resources. In addition to replicating within the new directory site in the expanded region, information needs to be replicated from the domain controllers in the home region to the new domain controllers in the expanded region, to bring the new domain controllers in sync. To maintain region isolation, a different administrator account having different credentials can be created for the new region and data can be replicated using cross-region replicator 208 so that credential sharing is not required. In some embodiments, cross-region replicator 208 can replicate data stored in one or more data stores associated with a given virtual network to expanded virtual networks in expanded regions and/or generate events consumed by various other components expanded regions, such as each expanded region's region orchestrator. This allows data and events to be transferred from one region to another, without requiring credential sharing.

At numeral 7, the cross-region replicator can obtain domain controller data and/or metadata from one of the home domain controllers 114. In some embodiments, the home domain controllers 114 may include a main domain controller from which the data and/or metadata may be obtained. At numeral 8, the cross-region replicator 208 can replicate the data and/or metadata to expand directory workflow 204. In some embodiments, the message from the cross-region replicator may be validated 203 to ensure the account associated with the cross-region replicator has access to the expanded region 104B before the data is replicated into the expanded region. The expand directory workflow can use this domain controller data and/or metadata 210 to setup at least one of the expanded domain controllers 124B, at numeral 9. In some embodiments, the cross-region workflow service 116 may additionally setup endpoints in each region to enable the customer to access the domain controllers in each region. The endpoints may be implemented as network interfaces that are associated with the domain controllers or other resources of the directory service in each region. The network interfaces may receive traffic from the other regions to enable communication with the domain controllers and/or other resources of the expanded regions. Once this first expanded domain controller 124B has been setup using the domain controller data and/or metadata, any other domain controllers in the expanded region can be replicated from this first expanded domain controller.

After the expanded domain controllers 124B have been setup, peering connections can be established with domain controllers in other regions, at numeral 10. Such peering connections enable a customer to route traffic between two or more virtual networks using private IP addresses. In some embodiments, expand directory workflow 204 can obtain region data 212 which includes address data for other expanded virtual networks in other expanded regions 104A-104N. The region data can be provided to the expanded domain controller 124B and used to send peering requests to the expanded virtual networks in the other expanded regions. In some embodiments, the expand directory workflow can wait until one or more of the peering requests have been accepted. Once at least one peering request has been accepted, remaining setup of the expanded directory site can be handed off to a region orchestrator 214, at numeral 11, and the lock 200 can be released. The region orchestrator can manage setup of additional domain controllers 124B, depending on the size of the directory being expanded or other configuration information included in the initial expand directory API request.

In some embodiments, once expansion into a region is in progress (e.g., after a CIDR block has been pre-allocated), a customer can send another add region request to the directory service in the home region and region expansion can continue in parallel.

Figure 3:
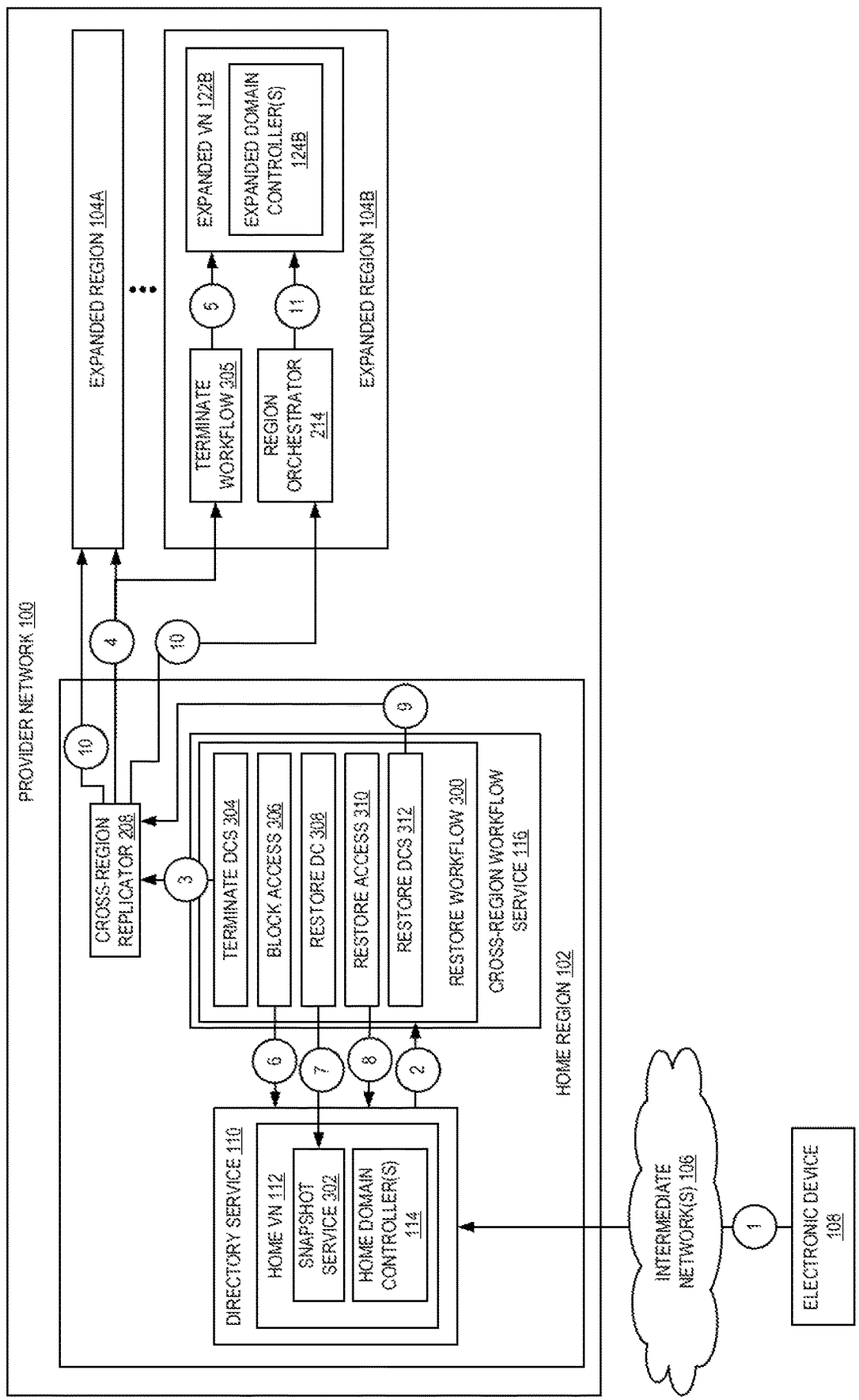
FIG. 3 is a diagram illustrating a restore workflow according to some embodiments.

FIG. 3 is a diagram illustrating a restore workflow according to some embodiments. As shown in FIG. 3, another cross-region workflow which may be performed is a restore workflow 300. In some embodiments, directory service 110 may provide a snapshot service 302 which can capture snapshots of a customer's domain controllers. In some embodiments, each virtual network in each region may include a snapshot service instance which periodically captures snapshots of the domain controllers in that region. In some embodiments, one snapshot service may capture snapshots of domain controllers from across all of the regions of the customer's directory. A user can send a request, at numeral 1, to directory service 110 to restore their directory from a snapshot. In some embodiments, the request may identify a snapshot to use to perform the restore.

At numeral 2, the directory service can call cross-region workflow service 116 to perform restore workflow 300. Restore workflow 300 can start by terminating all domain controllers 304 in the expanded regions 104A-104B of the customer's directory. Although only two expanded regions are shown in the example of FIG. 3, this is for simplicity of explanation. As discussed, a customer may choose to have more, or fewer expanded regions in a given implementation. At numeral 3, the restore workflow can send a request to cross-region replicator 208 to terminate the customer's domain controllers across regions and set the domain state in each region to a restoring state. At numeral 4, the cross-region replicator can send an event to each expanded region to initiate a terminate workflow 305 to terminate all domain controllers in their respective regions. At numeral 5, the terminate workflow can terminate the domain controllers 124 in the expanded region. This may include deprovisioning the resources associated the with domain controllers (e.g., the virtual machine, container, or other host(s) on which the domain controllers are running). In some embodiments, new domain controllers may be provisioned on new resources during this step. As discussed above, in some embodiments, each communication from the cross-region replicator into an expanded region may be validated (e.g., by an access control service, not shown) before it propagates an event and/or data into the expanded regions, to ensure the account associated with the cross-region replicator has been granted access to the expanded regions.

Once the termination of the domain controllers in the expanded regions 104A-104B has begun, the restore workflow can block ingress communication 306 to the home virtual network, at numeral 6. In some embodiments, this may include changing firewall or other access control rules associated with the home virtual network 112. While the directory is running normally, such ingress communication is enabled so that the directory resources in each region can communicate with one another. This prevents any domain controllers which have not yet terminated from communicating with the home domain controller 114. Without blocking communication, incorrect data could be replicated. This allows for the restore operation to be performed on the home domain controller 114 in isolation.

At numeral 7, the restore workflow can restore 308 the home domain controller 114 using the snapshot selected by the customer. Once the home domain controller 114 has been restored, ingress communication access 310 can be restored at numeral 8. This may include updating the firewall or other access control rules to allow communication from one or more IP addresses, CIDR blocks, etc., corresponding to the expanded regions. Once communication access has been restored, at numeral 9 a request can be sent to the cross-region replicator to instruct all expanded regions to restore 312 their domain controllers. At numeral 10, the cross-region replicator 208 can instruct the region orchestrator in each expanded region to bring their respective domain controllers online. At numeral 11, the region orchestrator can synchronize its domain controllers with the restored home domain controller, effectively restoring the directory in the expanded region.

FIG. 4 is a diagram illustrating example APIs for orchestration of directory management updates across regions according to some embodiments. As shown in FIG. 4, an example API as described herein may include an addRegion instruction 400, an expandDirectory instruction 408, and a restoreDirectory instruction 418. The addRegion instruction 400 can include a regionID 402 which may include an identifier (e.g., a name, number, or other identifier) associated with the region which is to be added to a customer's directory. In some embodiments, the addRegion instruction may include a directoryID 404 associated with the customer's directory which is to be expanded and a customerID 406 associated with the customer. In some embodiments, the addRegion instruction may further include a customerVN 407 which includes an identifier associated with the customer's virtual network in the expanded region.

In some embodiments, the expandDirectory instruction 408 may include a directoryID 410 associated with the customer's directory which is to be expanded and a customerID 412 associated with the customer. In some embodiments, the expandDirectory instruction 408 can include virtual network information 414 which may include the CIDR block, customer virtual network and subnets, or other address information that has been allocated to the new virtual network and a directorySize which may indicate a standard size or enterprise size, which corresponds to a size of the instances being allocated for the expanded director. In some embodiments, the expandDirectory instruction may include a number of directory controllers 417 which indicates the number of domain controllers to be provisioned in the new virtual network.

In some embodiments, the restoreDirectory instruction 418 can include a snapshotID 420 which indicates which snapshot is to be used to restore the customer's directory. The snapshotID may indicate a domain controller associated with the snapshot to be used and may identify the snapshot by timestamp, name, or other identifier.

Figure 5:
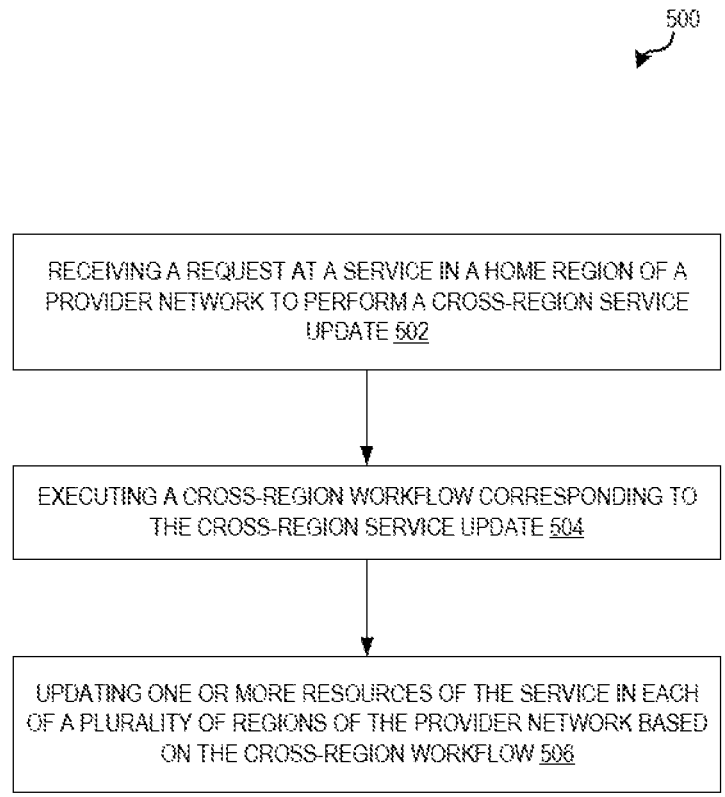
FIG. 5 is a flow diagram illustrating operations of a method for orchestration of directory management updates across regions according to some embodiments.

FIG. 5 is a flow diagram illustrating operations 500 of a method for orchestration of directory management updates across regions according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by directory service 110, cross-region workflow service 116, or cross-region replicator 208 of the other figures.

The operations 500 include, at block 502, receiving a request at a service in a home region of a provider network to perform a cross-region service update. In some embodiments, the service may be a directory service, and the cross-region service update may be a cross-region directory service update. In some embodiments, receiving a request at a service in a home region of a provider network to perform a cross-region service update, further comprises receiving a request to expand the service into an additional region of the provider network, the request including an identifier associated with the additional region of the provider network, wherein the service is a directory service.

In some embodiments. receiving a request at a service in a home region of a provider network to perform a cross-region directory update, further comprises receiving a request to restore the service to an earlier state from a snapshot, the request including an identifier associated with the snapshot to use to perform the restore, wherein the service is a directory service.

The operations 500 further include, at block 504, executing a cross-region workflow corresponding to the cross-region directory service update. In some embodiments, executing a cross-region workflow corresponding to the cross-region directory service update, further comprises executing an expand directory workflow to expand the directory service into the additional region of the provider network, the expand directory workflow including preallocating a range of IP addresses associated with a virtual network to be provisioned in the additional region of the provider network, provisioning directory service resources in the additional region of the provider network using the range of IP addresses, the directory service resources including the virtual network and one or more domain controllers, replicating domain controller data from a home domain controller in the home region to the one or more domain controllers in the additional region, and establishing peering connections between the one or more domain controllers in the additional region of the provider network and one or more domain controllers in the plurality of regions of the provider network.

In some embodiments, replicating domain controller data from a home domain controller in the home region to the one or more domain controllers in the additional region, further comprises reading domain controller data and metadata from the home region of the provider network, and replicating the domain controller data and metadata to a data store in the additional region associated with the expand workflow.

In some embodiments, executing a cross-region workflow corresponding to the cross-region directory service update, further comprises executing a restore directory workflow to restore the directory service to the earlier state, the restore directory workflow including sending a request to terminate all domain controllers in each of the plurality of regions of the provider network, disabling communication between the home region and the plurality of regions of the provider network, restoring a main domain controller in the home region based on the snapshot, enabling communication between the home region and the plurality of regions of the provider network, and sending a request to the plurality of regions of the provider network to restore all domain controllers based on the main domain controller.

In some embodiments, the operations may further include provisioning new domain controllers in each of the plurality of regions of the provider network, and synchronizing the new domain controllers based on the main domain controller.

The operations 500 further include, at block 506, updating one or more resources of the service in each of a plurality of regions of the provider network based on the cross-region workflow. In some embodiments, the resources of the service may include domain controllers of a directory service.

In some embodiments, the operations may further include receiving a request to expand the directory into a second additional region of the provider network, pre-allocating a second range of IP addresses associated with a second virtual network to be provisioned in the second additional region of the provider network, and executing the expand directory workflow to expand the directory into the second additional region of the provider network in parallel with the expand directory workflow to expand the directory into the additional region of the provider network.

In some embodiments, the operations may further include associating the directory service resources in the additional region of the provider network with a different administrator account than directory service resources in the home region of the provider network.

In some embodiments, the operations may include receiving a request to expand a directory service in a home region of a provider network into an additional region of the provider network, the request including an identifier associated with the additional region of the provider network, pre-allocating a classless inter-domain routing (CIDR) block for a virtual network to be provisioned in the additional region of the provider network, obtaining a global lock on the directory service, provisioning the virtual network and a plurality of domain controllers in the additional region of the provider network using the CIDR block, replicating domain controller data from a home domain controller in the home region to the plurality of domain controllers in the additional region, and establishing peering connections between the plurality of domain controllers in the additional region of the provider network and a plurality of domain controllers in the plurality of regions of the provider network.

In some embodiments, establishing peering connections between the plurality of domain controllers in the additional region of the provider network and a plurality of domain controllers in the plurality of regions of the provider network, further comprises determining at least one peering connection has been established between the plurality of domain controllers in the additional region of the provider network and at least one domain controller in at least one of the plurality regions of the provider network, and releasing the global lock on the directory service.

In some embodiments, the request to expand the directory service includes one or more of a directory identifier associated with the directory service, a region identifier associated with the additional region, and a number of domain controllers to provision in the additional region.

Figure 6:
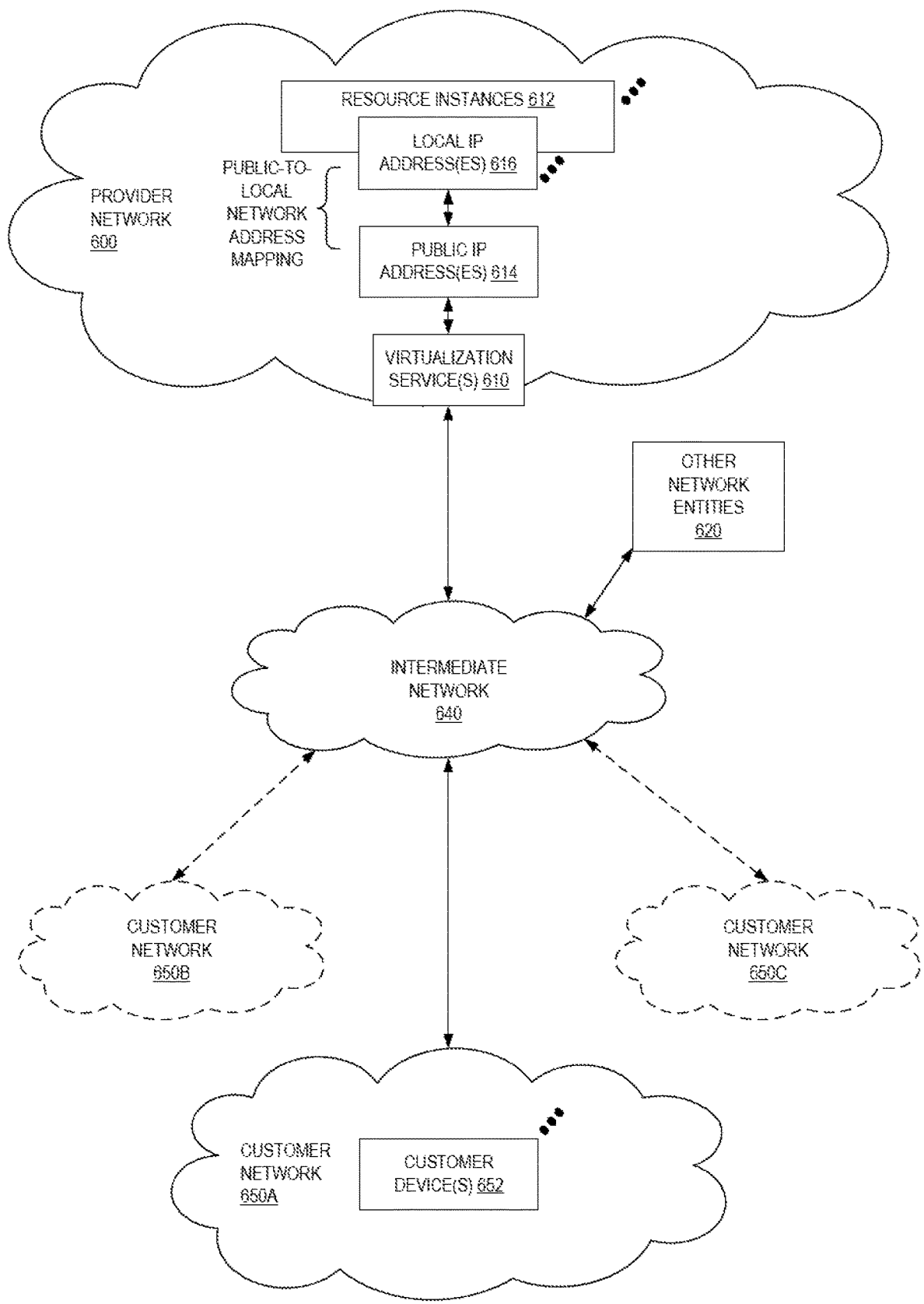
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
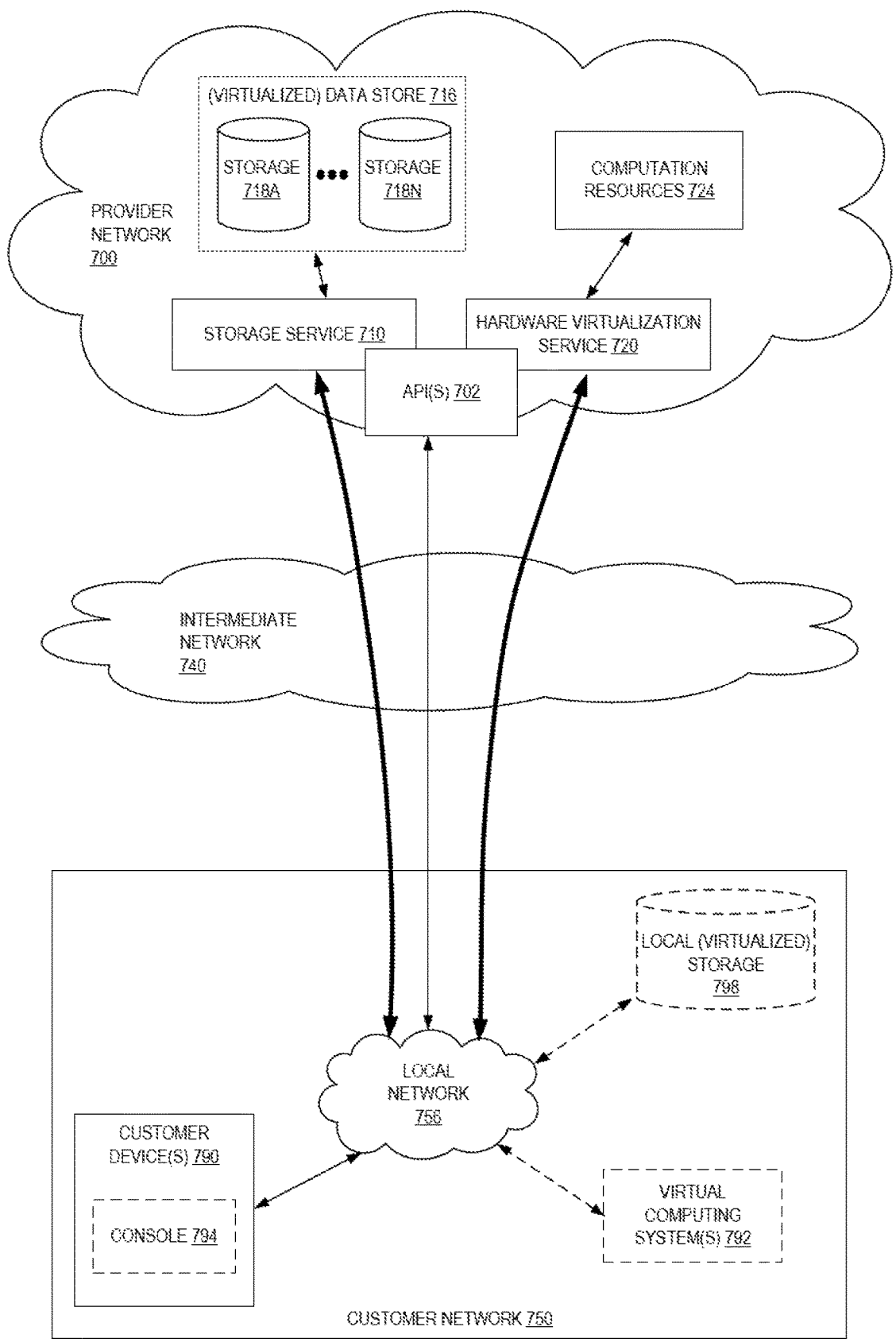
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple computation resources 724 (e.g., VMs) to customers. The computation resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Figure 8:
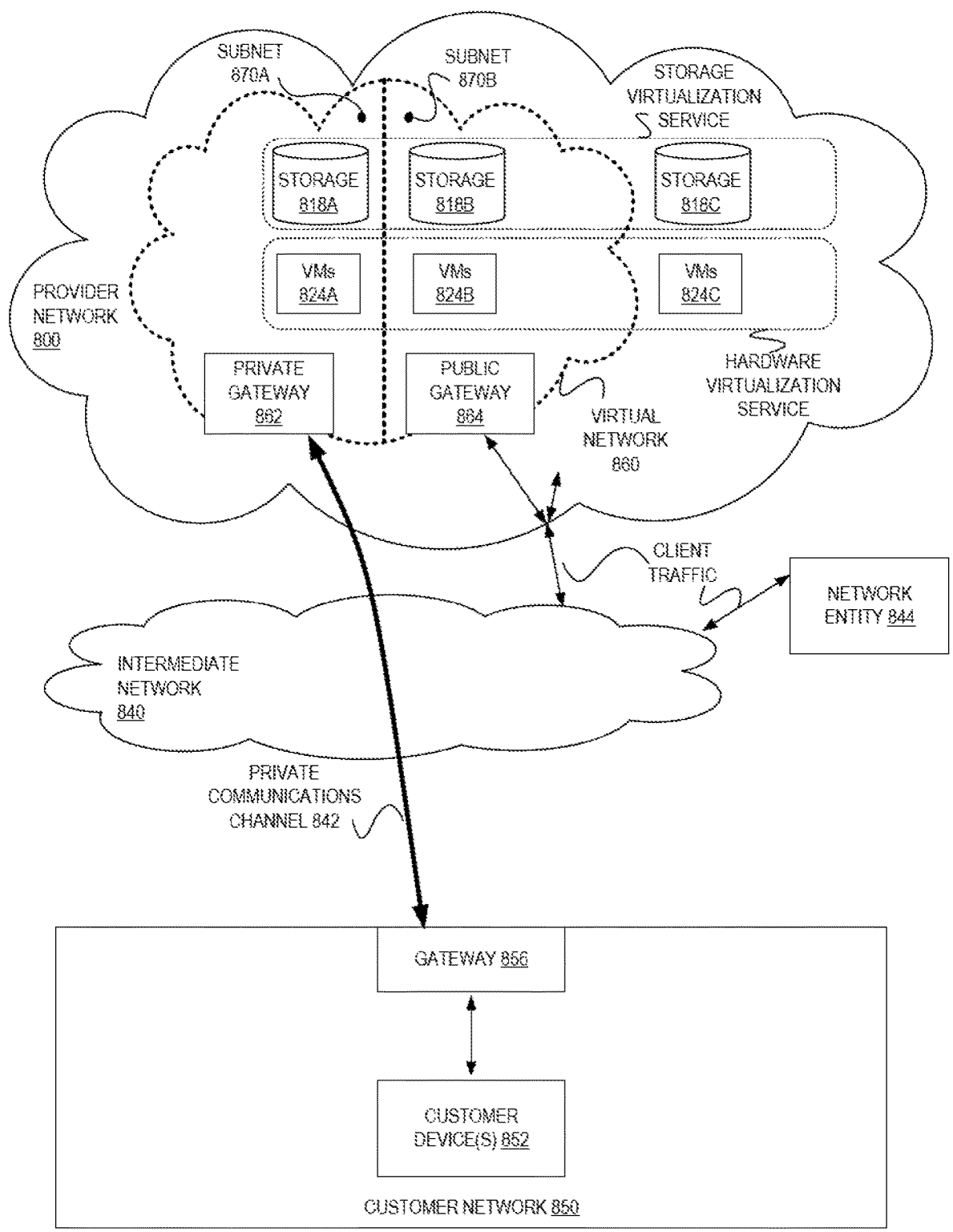
FIG. 8 illustrates an example provider network that provides virtual networks on the provider network to at least some customers, according to some embodiments.

FIG. 8 illustrates an example provider network that provides virtual networks on the provider network to at least some customers, according to some embodiments. A customer's virtual network 860 on a provider network 800, for example, enables a customer to connect their existing infrastructure (e.g., one or more customer devices 852) on customer network 850 to a set of logically isolated resource instances (e.g., VMs 824A and 824B and storage 818A and 818B), and to extend management capabilities such as security services, firewalls, and intrusion detection systems to include their resource instances.

A customer's virtual network 860 may be connected to a customer network 850 via a private communications channel 842. A private communications channel 842 may, for example, be a tunnel implemented according to a network tunneling technology or some other technology over an intermediate network 840. The intermediate network may, for example, be a shared network or a public network such as the Internet. Alternatively, a private communications channel 842 may be implemented over a direct, dedicated connection between virtual network 860 and customer network 850.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In some embodiments, either a shared network or a public network may serve as an intermediate network between a provider network and a customer network.

To establish a virtual network 860 for a customer on provider network 800, one or more resource instances (e.g., VMs 824A and 824B and storage 818A and 818B) may be allocated to the virtual network 860. Note that other resource instances (e.g., storage 818C and VMs 824C) may remain available on the provider network 800 for other customer usage. A range of public IP addresses may also be allocated to the virtual network 860. In addition, one or more networking nodes (e.g., routers, switches, etc.) of the provider network 800 may be allocated to the virtual network 860. A private communications channel 842 may be established between a private gateway 862 at virtual network 860 and a gateway 856 at customer network 850.

In some embodiments, in addition to, or instead of, a private gateway 862, virtual network 860 may include a public gateway 864 that enables resources within virtual network 860 to communicate directly with entities (e.g., network entity 844) via intermediate network 840, and vice versa, instead of or in addition to via private communications channel 842.

Virtual network 860 may be, but is not necessarily, subdivided into two or more subnetworks, or subnets, 870. For example, in implementations that include both a private gateway 862 and a public gateway 864, a virtual network 860 may be subdivided into a subnet 870A that includes resources (VMs 824A and storage 818A, in this example) reachable through private gateway 862, and a subnet 870B that includes resources (VMs 824B and storage 818B, in this example) reachable through public gateway 864.

The customer may assign particular customer public IP addresses to particular resource instances in virtual network 860. A network entity 844 on intermediate network 840 may then send traffic to a public IP address published by the customer; the traffic is routed, by the provider network 800, to the associated resource instance. Return traffic from the resource instance is routed, by the provider network 800, back to the network entity 844 over intermediate network 840. Note that routing traffic between a resource instance and a network entity 844 may require network address translation to translate between the public IP address and the local IP address of the resource instance.

Some embodiments may allow a customer to remap public IP addresses in a customer's virtual network 860 as illustrated in FIG. 8 to devices on the customer's external network 850. When a packet is received (e.g., from network entity 844), the network 800 may determine that the destination IP address indicated by the packet has been remapped to an endpoint on external network 850 and handle routing of the packet to the respective endpoint, either via private communications channel 842 or via the intermediate network 840. Response traffic may be routed from the endpoint to the network entity 844 through the provider network 800, or alternatively may be directly routed to the network entity 844 by the customer network 850. From the perspective of the network entity 844, it appears as if the network entity 844 is communicating with the public IP address of the customer on the provider network 800. However, the network entity 844 has actually communicated with the endpoint on customer network 850.

While FIG. 8 shows network entity 844 on intermediate network 840 and external to provider network 800, a network entity may be an entity on provider network 800. For example, one of the resource instances provided by provider network 800 may be a network entity that sends traffic to a public IP address published by the customer.

Illustrative Systems

Figure 9:
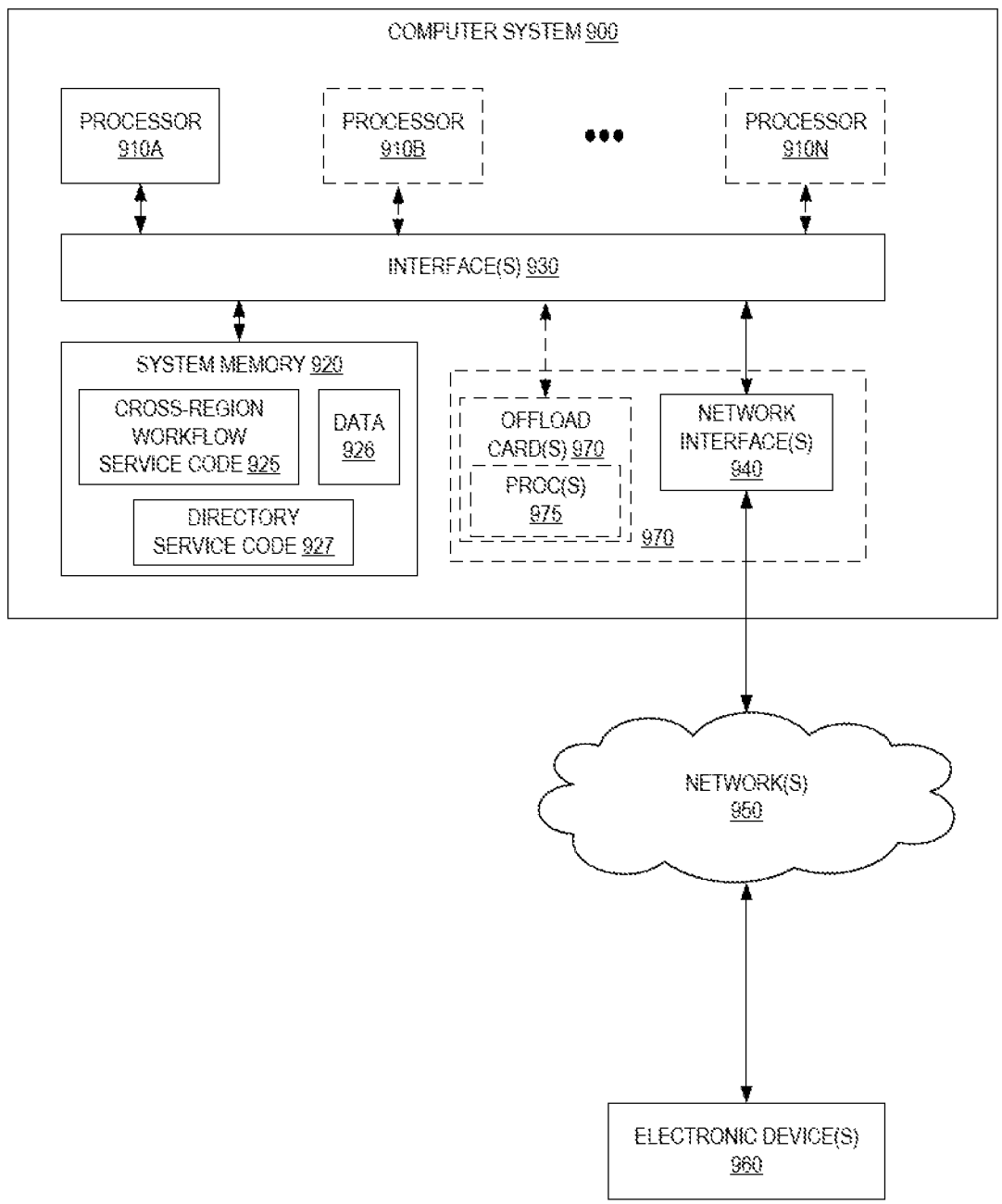
FIG. 9 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as cross-region workflow service code 925, directory service code 927, and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-910N of the computer system 900. However, in some embodiments the virtualization manager implemented by the offload card(s) 970 can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving a request to expand a directory service in a home region of a provider network into an additional region of the provider network, at least one of the home region or the additional region including two or more availability zones, the request including an identifier associated with the additional region of the provider network;
   pre-allocating a classless inter-domain routing (CIDR) block for a virtual network to be provisioned in the additional region of the provider network;
   obtaining a global lock on the directory service;
   provisioning the virtual network and a plurality of domain controllers in the additional region of the provider network using the CIDR block;
   replicating domain controller data from a home domain controller in the home region to the plurality of domain controllers in the additional region; and
   establishing peering connections between the plurality of domain controllers in the additional region of the provider network and a plurality of domain controllers in a plurality of other regions of the provider network.

2. The computer-implemented method of claim 1, wherein establishing peering connections between the plurality of domain controllers in the additional region of the provider network and a plurality of domain controllers in the plurality of regions of the provider network, further comprises:
   determining at least one peering connection has been established between the plurality of domain controllers in the additional region of the provider network and at least one domain controller in at least one of the plurality regions of the provider network; and
   releasing the global lock on the directory service.

3. The computer-implemented method of claim 1, wherein the request to expand the directory service includes one or more of a directory identifier associated with the directory service, a region identifier associated with the additional region, and a number of domain controllers to provision in the additional region.

4. A computer-implemented method comprising:
   receiving a request at a service in a home region of a provider network to perform a cross-region service update, the home region including two or more availability zones;
   executing a cross-region workflow corresponding to the cross-region service update; and
   updating one or more resources of the service in each of a plurality of other regions of the provider network based on the cross-region workflow, at least one of the other regions including two or more availability zones.

5. The computer-implemented method of claim 4, wherein receiving a request at a service in a home region of a provider network to perform a cross-region service update, further comprises:
   receiving a request to expand the service into an additional region of the provider network, the request including an identifier associated with the additional region of the provider network, wherein the service is a directory service.

6. The computer-implemented method of claim 5, wherein executing a cross-region workflow corresponding to the cross-region directory service update, further comprises:
executing an expand directory workflow to expand the directory service into the additional region of the provider network, the expand directory workflow including:
pre-allocating a range of IP addresses associated with a virtual network to be provisioned in the additional region of the provider network;
provisioning directory service resources in the additional region of the provider network using the range of IP addresses, the directory service resources including the virtual network and one or more domain controllers;
replicating domain controller data from a home domain controller in the home region to the one or more domain controllers in the additional region; and
establishing peering connections between the one or more domain controllers in the additional region of the provider network and one or more domain controllers in the plurality of regions of the provider network.

7. The computer-implemented method of claim 6, wherein replicating domain controller data from a home domain controller in the home region to the one or more domain controllers in the additional region, further comprises:
reading domain controller data and metadata from the home region of the provider network; and
replicating the domain controller data and metadata to a data store in the additional region associated with the expand workflow.

8. The computer-implemented method of claim 7, further comprising:
receiving a request to expand the directory into a second additional region of the provider network;
pre-allocating a second range of IP addresses associated with a second virtual network to be provisioned in the second additional region of the provider network; and
executing the expand directory workflow to expand the directory into the second additional region of the provider network in parallel with the expand directory workflow to expand the directory into the additional region of the provider network.

9. The computer-implemented method of claim 6, further comprising:
associating the directory service resources in the additional region of the provider network with a different administrator account than directory service resources in the home region of the provider network.

10. The computer-implemented method of claim 4, wherein receiving a request at a service in a home region of a provider network to perform a cross-region service update, further comprises:
receiving a request to restore the service to an earlier state from a snapshot, the request including an identifier associated with the snapshot to use to perform the restore, wherein the service is a directory service.

11. The computer-implemented method of claim 10, wherein executing a cross-region workflow corresponding to the cross-region directory service update, further comprises:

executing a restore directory workflow to restore the directory service to the earlier state, the restore directory workflow including:
sending a request to terminate all domain controllers in each of the plurality of regions of the provider network;
disabling communication between the home region and the plurality of regions of the provider network;
restoring a main domain controller in the home region based on the snapshot;
enabling communication between the home region and the plurality of regions of the provider network; and
sending a request to the plurality of regions of the provider network to restore all domain controllers based on the main domain controller.

12. The computer-implemented method of claim 11, further comprising:
provisioning new domain controllers in each of the plurality of regions of the provider network; and
synchronizing the new domain controllers based on the main domain controller.

13. A system comprising:
at least one memory storing instructions;
at least one processor configured to execute the instructions;
a service implemented by a first one or more electronic devices; and
a cross-region workflow service implemented by a second one or more electronic devices, the cross-region workflow service including the instructions that upon execution by the at least one processor cause the cross-region workflow service to:
receive a request from the service in a home region of a provider network to perform a cross-region directory service update, the home region including two or more availability zones;
execute a cross-region workflow corresponding to the cross-region directory service update; and
update one or more resources of the service in each of a plurality of other regions of the provider network based on the cross-region workflow, at least one of the other regions including two or more availability zones.

14. The system of claim 13, wherein to receive a request at a service in a home region of a provider network to perform a cross-region service update, the instructions, when executed, further cause the cross-region workflow service to:
receive a request to expand the service into an additional region of the provider network, the request including an identifier associated with the additional region of the provider network, wherein the service is a directory service.

15. The system of claim 14, wherein to execute a cross-region workflow corresponding to the cross-region directory service update, the instructions, when executed, further cause the cross-region workflow service to:
execute an expand directory workflow to expand the directory service into the additional region of the provider network, the expand directory workflow including:
pre-allocating a range of IP addresses associated with a virtual network to be provisioned in the additional region of the provider network;
provisioning directory service resources in the additional region of the provider network using the range of IP addresses, the directory service resources including the virtual network and one or more domain controllers;

replicating domain controller data from a home domain controller in the home region to the one or more domain controllers in the additional region; and establishing peering connections between the one or more domain controllers in the additional region of the provider network and one or more domain controllers in the plurality of regions of the provider network.

16. The system of claim 15, wherein to replicate domain controller data from a home domain controller in the home region to the one or more domain controllers in the additional region, the instructions, when executed, further cause the cross-region workflow service to:

read domain controller data and metadata from the home region of the provider network; and replicate the domain controller data and metadata to a data store in the additional region associated with the expand workflow.

17. The system of claim 16, wherein the instructions, when executed, further cause the cross-region workflow service to:

receive a request to expand the directory into a second additional region of the provider network;

pre-allocate a second range of IP addresses associated with a second virtual network to be provisioned in the second additional region of the provider network; and execute the expand directory workflow to expand the directory into the second additional region of the provider network in parallel with the expand directory workflow to expand the directory into the additional region of the provider network.

18. The system of claim 15, wherein the instructions, when executed, further cause the cross-region workflow service to:

associate the directory service resources in the additional region of the provider network with a different administrator account than directory service resources in the home region of the provider network.

19. The system of claim 13, wherein to receive a request at a service in a home region of a provider network to perform a cross-region service update, the instructions, when executed, further cause the cross-region workflow service to:

receive a request to restore the service to an earlier state from a snapshot, the request including an identifier associated with the snapshot to use to perform the restore, wherein the service is a directory service.

20. The system of claim 19, wherein to execute a cross-region workflow corresponding to the cross-region directory service update, the instructions, when executed, further cause the cross-region workflow service to:

execute a restore directory workflow to restore the directory service to the earlier state, the restore directory workflow including:

sending a request to terminate all domain controllers in each of the plurality of regions of the provider network;

disabling communication between the home region and the plurality of regions of the provider network;

restoring a main domain controller in the home region based on the snapshot;

enabling communication between the home region and the plurality of regions of the provider network;

sending a request to the plurality of regions of the provider network to restore all domain controllers based on the main domain controller;

provisioning new domain controllers in each of the plurality of regions of the provider network; and synchronizing the new domain controllers based on the main domain controller.

* * * * *